United States Patent [19]

Eaton et al.

[11] 3,975,906

[45] Aug. 24, 1976

[54] TWIN FLOW MODULATED TORQUE CONVERTER

[75] Inventors: Lyle E. Eaton, Pekin; John H. Hyler, Peoria, both of Ill.

[73] Assignee: Westinghouse Air Brake Company, Peoria, Ill.

[22] Filed: Mar. 3, 1975

[21] Appl. No.: 554,837

[52] U.S. Cl. .................................. 60/347; 60/349; 60/350; 60/361; 60/364
[51] Int. Cl.² ..................................... F16D 33/08
[58] Field of Search ............. 60/342, 347, 349–350, 60/352, 353, 359, 361, 364, 367, 494, 351

[56] References Cited
UNITED STATES PATENTS

| | | | |
|---|---|---|---|
| 2,354,596 | 7/1944 | Jandasek | 60/353 X |
| 2,384,841 | 9/1945 | Lang et al. | 60/239 |
| 3,220,187 | 11/1965 | Perkins | 60/352 |

*Primary Examiner*—Edgar W. Geoghegan
*Attorney, Agent, or Firm*—Robert J. Eck

[57] ABSTRACT

A twin-flow modulating torque converter having a torus which is defined by walls and rings of the pump, turbine and reactor members, and formed with a fluid bypass in the rings for developing an alternate flow circuit which bypasses the blades of one or more members of the fluid circuit; the fluid bypass being normally closed by the reactor member which is adapted for linear movement to open the fluid bypass for accomplishing varying degrees of modulation. The pump and turbine members are adapted to move relative to each other during operation for varying the cross-sectional area of the fluid bypass.

16 Claims, 8 Drawing Figures

TWIN FLOW MODULATED TORQUE CONVERTOR

BACKGROUND AND SUMMARY OF THE INVENTION

The present invention relates in general to hydrodynamic drives, and more particularly, to a twin-flow modulated torque converter.

Prior art torque converters incorporate at least one of three basic elements: a rotatable bladed pump or impeller member which is coupled to the input or drive shaft of a prime mover; a rotatable bladed turbine or runner member coupled to an output or driven shaft; and a reactor or stator member positioned between the outlet of the turbine member and the inlet of the pump for directing the flow of the fluid discharged by the turbine before redirecting same to the pump. In addition to these three basic elements, some prior art structures have employed means to interrupt and/or to modulate the hydrodynamic power transmission from the prime mover to output drive means for varying the torque absorbed or the power transmitted at any predetermined input speed.

Some prior art devices employed mechanical clutch elements between the input shaft and the torque converter, such as the Omega Drive System of Twin Disc Inc., for modulating the torque between the input and the output drives. The slippage of the clutch surfaces is controlled to proportion the input power between the torque converter input and the torque converter output shaft. Although full modulation can be achieved, these devices are undesirable because the overall efficiency of the system is reduced through dissipation of energy through the heat buildup between the clutch surfaces. Moreover, the attendant wear of the clutch surfaces requires frequent adjustment and replacement.

Other prior art devices, such as the Buick Variable-Pitch Dynaflow Torque Converter, employed devices to alter the pitch of the reactor blades to modulate the torque absorption characteristics of the torque converter. The range of modulation could be improved as it tended to be from 100% torque down to about 60% torque in operation. Moreover, each vane required a separate pivot mounting thereby increasing the complexity of the device as well as the likelihood of failure in operation.

Still other prior art devices utilize means for interrupting the fluid toric flow in operation. Exemplary of these devices are the patents to Audiffred et al, U.S. Pat. No. 3,673,799 and R. T. Burnett, U.S. Pat. No. 2,580,072. Both structures are designed to temporarily reduce the torque output when a multispeed transmission is shifted into a different gear. Since both devices function to block the hydrodynamic flow in the torque converter, the total energy input thereto must be largely dissipated in heat. Accordingly, both devices may be engaged only briefly in order to avoid excessive temperatures in the torque converter. Also, the full input power of these devices cannot be made available for other purposes when the fluid path in the torus is blocked.

The present invention circumvents the above disadvantages of the prior art by providing a torque converter with twin flow circuits in the torus to approach full-range modulation with little energy dissipated through heat. In one flow circuit, fluid flow passes normally through the pump, turbine, and reactor members to accomplish full power capacity. In one embodiment of the twin or alternate flow circuit, fluid flow to the turbine member is interrupted and directed through a fluid bypass formed in the rings of the pump and turbine members, to effect minimum drive through the torque converter while continuing the pump rotation for driving a power take-off shaft. The bypass circuit is normally closed by the ring of the reactor member, which is adapted for linear movement in varying positions so that intermediate stages of modulation between the minimum and the maximum can be achieved as well.

In another embodiment of the present invention, the pump and turbine members are adapted to move relative to each other for varying the cross section area of the fluid bypass. Through this feature, the overall performance of the torque converter will be enhanced.

Accordingly, the instant invention effects substantially complete and continuous interruption of the toric flow, which drives the turbine member, by diverting same through the bypass circuit without experiencing overheating or loss of input power as in the prior art structures. Accordingly, substantially full-range modulation can be achieved over an extended time.

Moreover, the torque converter of the present invention requires no clutch mechanisms to modulate power thereby experiencing longer life through less wear and greater efficiency through less energy dissipation through heat. Also, the torque converter of the present invention eliminates complex mechanical features, such as variable pitch reactor vanes, thereby being more reliable in operation while permitting wider range of vehicle drive torques and speeds.

DESCRIPTION OF PRACTICAL EMBODIMENTS

Figure 1:
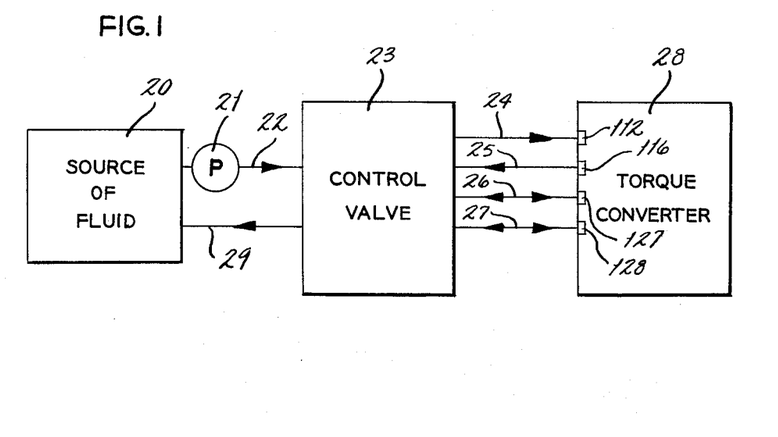
FIG. 1 is a schematic fluid flow diagram incorporating a torque convertor constructed in accordance with and embodying the present invention.
Figure 2:
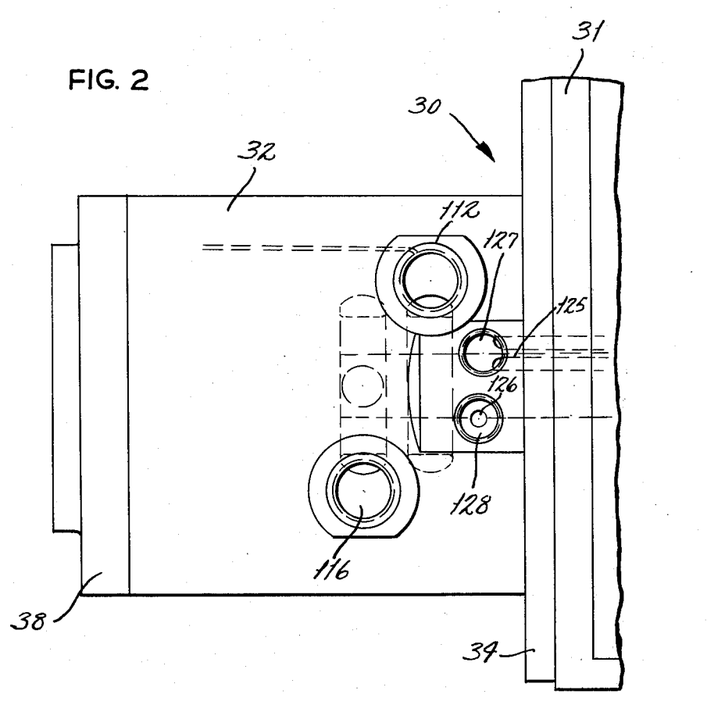
FIG. 2 is a fragmentary top view of the torque convertor housing illustrating the fluid ports.

Referring now to the drawings wherein like reference characters designate like corresponding parts, there is shown in FIG. 1 a source of fluid 20 incorporating a pump 21 for directing fluid through a supply line 22 to a control valve 23 which selectively regulates and directs fluid flow through lines 24, 25, 26 and 27 to a torque converter 28 and returns same to said source of fluid 20 through a return line 29. The control valve 23 is of conventional construction, such as the spool valve variety, which is conveniently controlled through customary circuitry such as a function of the shifting operation of a vehicle (not shown).

Figure 3:
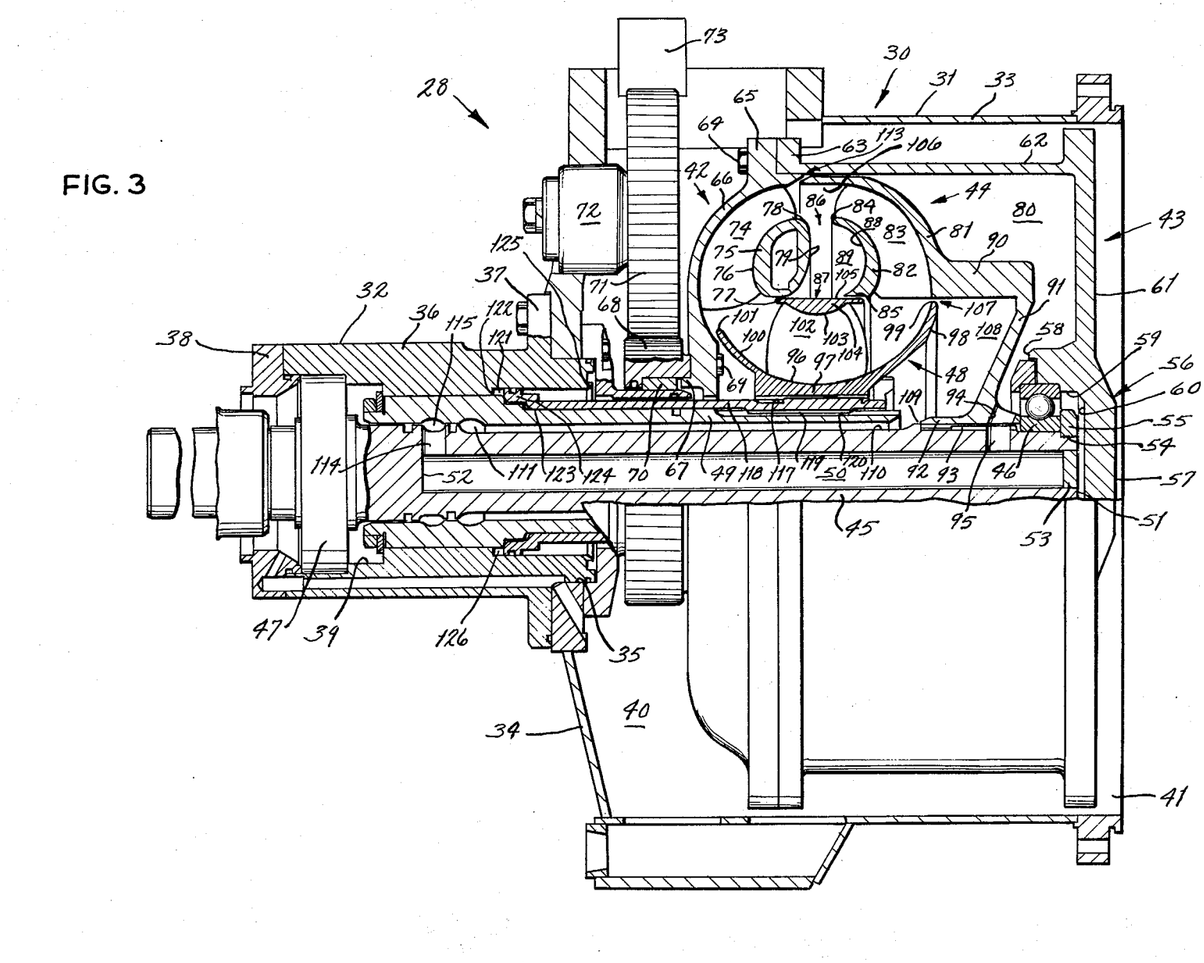
FIG. 3 is a side view of the torque convertor housing in partial vertical section illustrating the torque convertor in full power flow position.

In FIG. 3, the torque converter 28 generally comprises a housing 30 having a forward portion 31 and a rearward portion 32. The forward portion 31 comprises a substantially annular side wall 33 and a rear wall 34 which diverges radially inwardly and rearwardly terminating at a peripheral opening 35. The rearward portion 32 is provided with an annular side wall 36 having in its forward portion an integrally formed peripheral flange 37 which is conveniently mounted to the rear wall 34 of forward portion 31. The annular side wall 36 projects rearwardly and terminates into a bearing retaining plate 38.

The bearing retaining plate 38 and rearward portion 32 contain an axial bore 39 extending therethrough and opening into an enlarged chamber 40 defined by the rear wall 34 and annular side wall 33 of the forward portion 31. Said chamber 40 is furnished with an opening 41 to the front for receiving said torque converter 28 which generally comprises: a pump 42 suitably secured to the flywheel 43 of a vehicle engine (not shown); a turbine 44 fixed to an output shaft 45, which extends coaxially through the forward and rearward portions 31, 32, respectively, being journaled for rotation within forward and rearward bearings 46, 47, respectively; and a reactor member 48 slideably engaged for axial movement on a reaction sleeve 49 which is provided surroundingly of a portion of the output shaft 45 and fixed within the rearward portion 32.

The output shaft 45 is provided with an axial bore 50, which opens through the forward end wall 51 of the output shaft 45 and terminates at end wall 52; there being a pipe plug 53 received within said axial bore 50 in flush endwise relationship with forward end wall 51. Said output shaft 45 is machined with external threads 54 to threadedly engage a nut 55 having its rearward face abutting against said forward bearing 46.

Said flywheel 43 comprises a hub 56 having a forward face 57 suitably secured to the engine drive shaft (not shown), and a rearward face 58 formed with a pocket 59 which receives said forward bearing 46 and the related end portion of output shaft 45; the forward end wall 51 of output shaft 45 being in spaced relationship with the end wall 60 formed by pocket 59.

Projecting radially outwardly from the hub 56 is a web 61 which is formed integrally with a rearwardly extending annular flange 62 having a mounting skirt 63 at its extremity. The mounting skirt 63 is fixed, as by a plurality of bolts 64, to a mounting rim 65 being integrally cast with the arcuate wall 66 of the pump 42. The arcuate wall 66 terminates into a rearwardly extending hub 67 on which is mounted a pump gear 68 being suitably secured to pump 42, as by bolts 69. The pump gear 68 rotates about a roller bearing 70 and meshes with an idler gear 71, being suitably supported by a bearing 72 in rear end wall 34 for driving a power take off shaft, generally designated 73.

Projecting radially inwardly from the arcuate wall 66 are a plurality of vanes or blades 74 connected to a ring 75 defined by an arcuate wall 76 having a leading edge 77 and a trailing edge 78. Inwardly of arcuate wall 75, the leading and trailing edges 77, 78 are connected by a convex panel 79.

The turbine 44 is received within the chamber 80, defined by the flange 62 and web 61, and comprises an arcuate wall 81 and a ring 82 with intervening vanes or blades 83 therebetween. Said ring 82 incorporates a leading margin 84 and a trailing margin 85, which margins 84, 85 are located in spaced relationship to the related trailing edge 78 and leading edge 77, respectively, of the pump ring 75 to define an inlet opening 86 and an outlet opening 87, respectively. The convex panel 79 and the inner arcuate surface 88 of ring 82 cooperate to define a fluid bypass 89.

The turbine arcuate wall 81 is formed integral with a forwardly projecting plate 90 being supported by a connector 91 extending inwardly and rearwardly into a horizontal leg 92 which is keyed at 93 to the output shaft 45 for rotation therewith. Forwardly of connector 91, said horizontal leg 92 is fashioned with a bore 94 which is in registration with a passage 95 formed within said output shaft 45, thereby effecting communication between said chamber 80 and the axial bore 50 of output shaft 45.

The reactor member 48 comprises a concavely-curved plate 96 having: a central portion 97; a forward portion 98, which curves forwardly and outwardly from the central portion 97 terminating in an end margin 99 located adjacent turbine wall 81; and a rearward portion 100 which curves rearwardly and outwardly terminating in an end margin 101 adjacent pump arcuate wall 66. Projecting radially inwardly from central portion 97 are a plurality of stator vanes 102 connected to the arcuate face 103 of a ring 104 having a flat surface 105 located adjacent the leading edge 77 of the pump ring 75 and the trailing margin 85 of the turbine ring 82 for substantially occluding the outlet opening 87 of fluid bypass 89.

It will be observed that the inner faces of the pump arcuate wall 66, the turbine arcuate wall 81, and the reactor plate 96 cooperate to define the outer periphery of a torus 106; the inner periphery of the torus 106 being defined by the rings 75, 82 and 104.

Fluid enters the torus 106 through an inlet spacing 107 provided between the end margin 99 of the reactor forward portion 98 and the turbine arcuate wall 81; said inlet spacing 107 being in communication with a fluid compartment 108 defined by the forwardly projecting plate 90, connector 91 and horizontal leg 92 of the turbine 44 and the forward portion 98 of the reactor member 48. Said fluid compartment 108 opens through passage 109 into a conduit 110 formed between the output shaft 45 and the reaction sleeve 49, which conduit 110 is in communication through an annular recess 111 and an inlet port 112 to said fluid line 24.

The fluid in torus 106 is discharged through an outlet spacing 113 which opens into said chamber 80 at the junction between the pump arcuate wall 66 and the turbine arcuate wall 81. All fluid entering said chamber 80 is directed through said bore 94, passage 95, and bore 50 for discharge through a passage 114, located adjacent end wall 52, an annular recess 115, and a return port 116 connected to said fluid line 25.

The curved plate 96 of the reactor member 48 is splined at 117 to a tubular member 118 having internal splines 119 in its forward portion to slideably engage complementary splines 120 of the reaction sleeve 49. The tubular member 118 projects rearwardly into a piston chamber 121, located in the rearward portion 32 of housing 30, and developed by a counterbore 122 in said axial bore 30 and a diametrically reduced portion 123 of reaction sleeve 49. The rearward end portion of tubular member 118 incorporates a piston 124 which is adapted for slideable movement within piston chamber 121 responsive to fluid pressure.

Said piston chamber 121 is in communication with a forward fluid passage 125 and a rearward fluid passage 126, both passages 125, 126 extending through side wall 36 for connection to a maximum power port 127 of fluid line 26 and a minimum power port 128 of fluid line 27, respectively.

It will be understood that a free-wheeling reactor may be substituted for the reactor member 48 without departing from the scope of the present invention.

OPERATION

In operation, torque is supplied to flywheel 43 and is transmitted to the output shaft 45 in accordance with the hydraulic interaction between the pump 42, the turbine 44 and the reactor 48. The amount of torque transmitted or absorbed will depend upon the load experienced on the output shaft 45. Rotation of the pump 42 provides fluid flow for driving the turbine 44 and maintains a fluid pressure within torus 106.

The torus 106 is charged with fluid through the inlet port 112, annular recess 111, conduit 110, passage 109, fluid compartment 108 and inlet spacing 107. In full-power position (FIG. 3) the pump 42 rotates, thereby imparting energy to the fluid which follows a circular clockwise path for striking the vanes 83 of the turbine 44 at a predetermined angle to impart a turning force. The turbine vanes 83 receive the fluid and extract maximum force by changing the direction of flow in an opposite direction of both the pump 42 and the turbine 44. The fluid flow is then passed through stator vanes 102 and again reversed for redirection to the pump 42. In this manner, the fluid assists the vehicle engine (not shown) in rotating the pump 42 and provides torque multiplication in usage. The greater the load on the output shaft 45, the more the turbine 44 resists turning and the greater the fluid velocity becomes in the torus 106.

In the minimum power or full-bypass position (FIG. 4a) fluid is directed through the minimum power port 128 through the rearward fluid passage 126 into the piston chamber 121 for urging the piston 124 forwardly; the fluid on the opposite face of piston 124 being returned through forward fluid passage 125 and maximum power port 127 to conduit 26. With the forward movement of the piston 124, the plate 96 of reactor member 48 moves forwardly to present the forward portion 98 adjacent the connector 91 so the flat surface 105 of ring 104 substantially blocks the discharge of the turbine 44. The fluid flow within torus 106 then circulates in a clockwise path entering the inlet opening 86 of fluid bypass 89 and exiting through the outlet opening 87 to re-enter the vanes 74 of the pump 42. In this manner, the flow of fluid continues through the alternate flow path of bypass 89 with reduced power transmission and without developing much heat and, thus, loss in efficiency. Any excess fluid in torus 106 will be returned through outlet spacing 113, fluid compartment 80, bore 94, passage 95, output shaft bore 50, passage 114, annular recess 115 and return port 116 to fluid line 25.

Figure 4A:
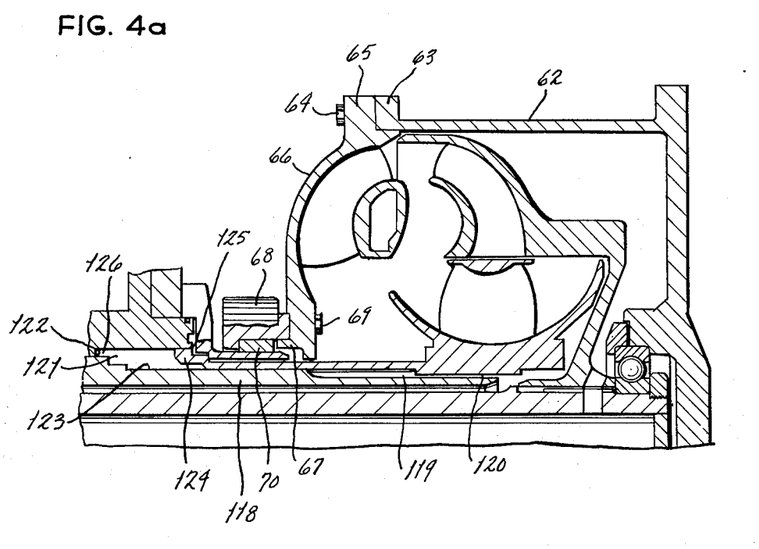
FIG. 4a is a fragmentary section through the torque convertor illustrating same in full bypass flow position.

In the minimum power or full bypass position, the turbine 44 continues to be driven but at a reduced level of approximately 10% power, with the remaining power driving the power take off shaft 73 through pump gear 68 and idler gear 71. The ratio of power distributed between the power take off shaft 73 and the output shaft 45 normally is in the range between 6:1 and 9:1 when the reactor member 48 is in minimum power position.

To return reactor member to its full-power position (FIG. 3), fluid is directed through conduit 26 to maximum power port 127 for directing fluid through forward fluid passage 125 into piston chamber 121 for urging the piston 124 rearwardly; the fluid in piston chamber 121 on the opposite face of piston 124 being returned through rearward fluid passage 126 and minimum power port 128 to conduit 27.

Figure 4B:
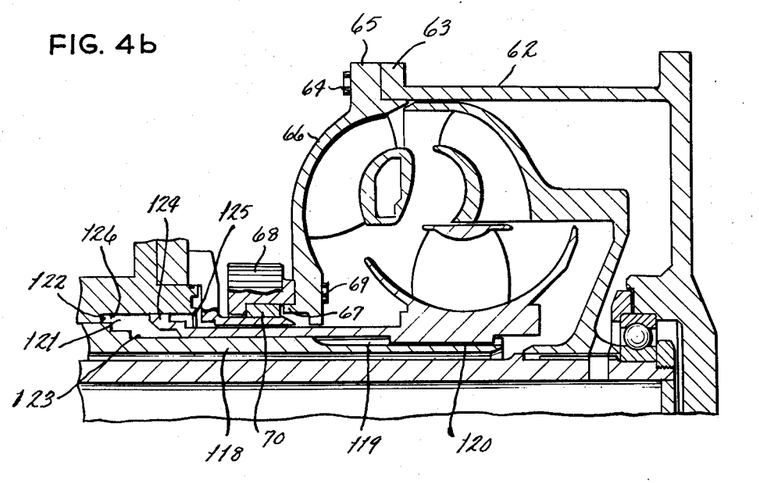
FIG. 4b is a fragmentary section through the torque convertor illustrating same in an intermediate position.

By regulating the fluid flow through forward and rearward passage 125, 126, respectively, an intermediate position of reactor member 48 may be obtained as illustrated in FIG. 4b. In said intermediate position, the fluid flow is simultaneously directed from the pump 42 through the turbine vanes 83 and stator vanes 102, as well as through the fluid bypass 89, thereby achieving an intermediate range of modulation.

Figure 6:
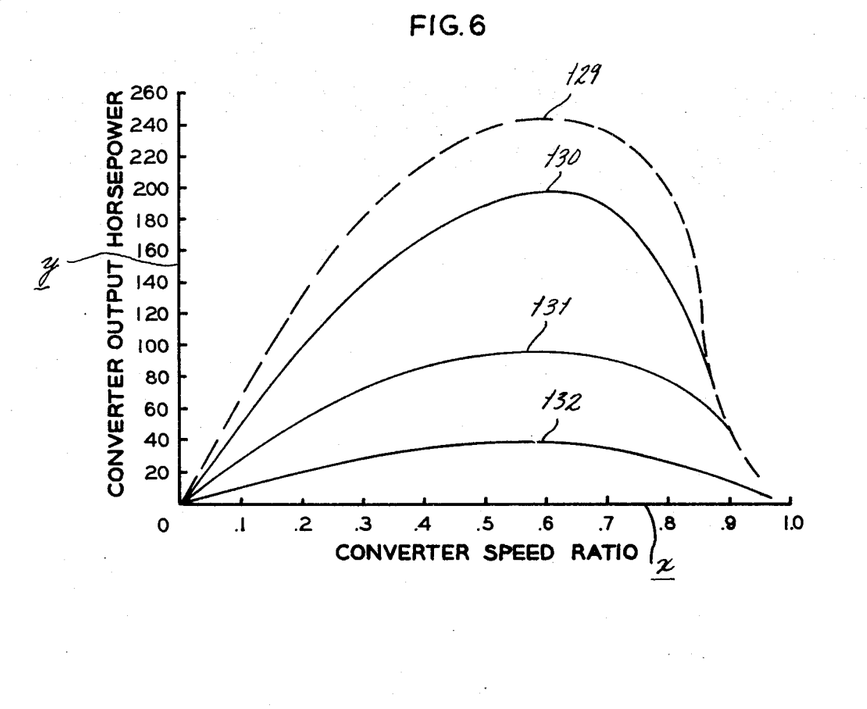
FIG. 6 is a graphical view showing the performance characteristics of the torque convertor where the output horsepower is plotted against the ratio of output speed to input speed.
Figure 7:
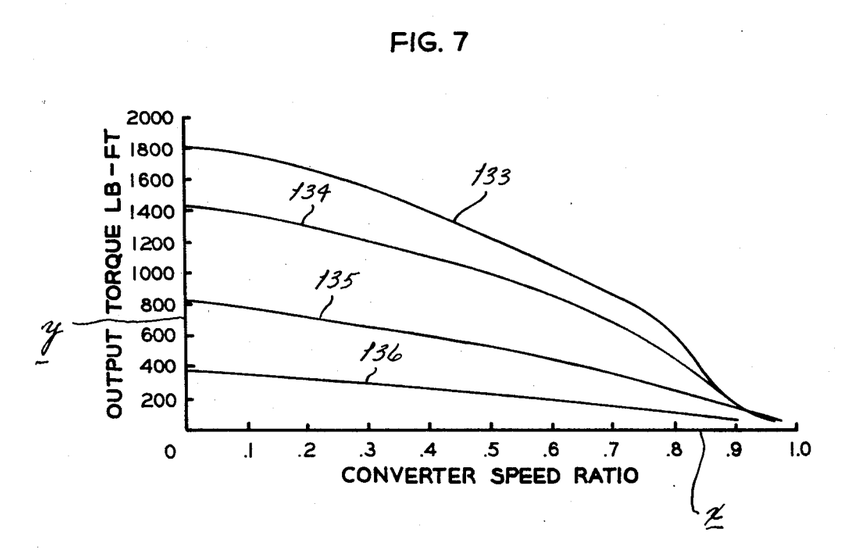
FIG. 7 is a graphical view showing the performance characteristics of the torque convertor where the output torque is plotted against the ratio of output speed to input speed.

The performance of the torque converter 28 of the present invention is illustrated in FIGS. 6 and 7 showing performance curves under varying positions of the reactor member 48. In both FIGS. 6 and 7 the Abscissa $x$ plots the speed ratio of the torque converter 28, being the ratio of the output shaft speed divided by the input speed. With a speed ratio of 0, the output shaft 45 does not rotate but the input speed of the flywheel 43 is rotating at a fixed velocity. With the speed ratio of 1, the input velocity and the output velocity are equal.

In FIG. 6 the ordinate $y$ plots the output horsepower of the torque converter 28 showing the varying horsepower when the reactor member 48 is in different positions. Curve 129 shows the normal output horsepower when the reactor member 48 is at full-power position (FIG. 3) or 0% stroke. Curve 130 shows the output horsepower when the reactor member 48 is in the intermediate position (FIG. 4b) or at 50% stroke. Curve 131 shows the output horsepower when the reactor member 48 is at 87.5% stroke; curve 132 shows the output horsepower when the reactor member 48 is in minimum power or full-bypass position (FIG. 4a) or 100% stroke. It will be observed that at 0.6 speed ratio the output horsepower range is between 246 horsepower and 41 horsepower at the same engine speed. Importantly, when 41 horsepower is available at the output shaft 45, the balance of power is available to the power takeoff shaft 73 which is driven by the pump and idler gears 68 and 71, respectively.

In FIG. 7, the ordinate $y$ plots the output torque illustrating the varying torque when the reactor member 48 is in various positions; curve 133 being at 0% stroke, curve 134 at 50% stroke; curve 135 at 87.5% stroke, and curve 136 at 100% stroke. It will be observed that when the torque converter speed ratio is zero, the full power position produced 1800 foot-pounds of torque while the minimum power position produced only 370 foot-pounds of torque.

Therefore, by the twin flow modulating torque converter 28, full range modulation may be achieved, with little energy dissipated through heat, and the generated power may be divided in varying ratios between the output shaft 45 and the power takeoff shaft 73.

DESCRIPTION OF ANOTHER PRACTICAL EMBODIMENT

Figure 5:
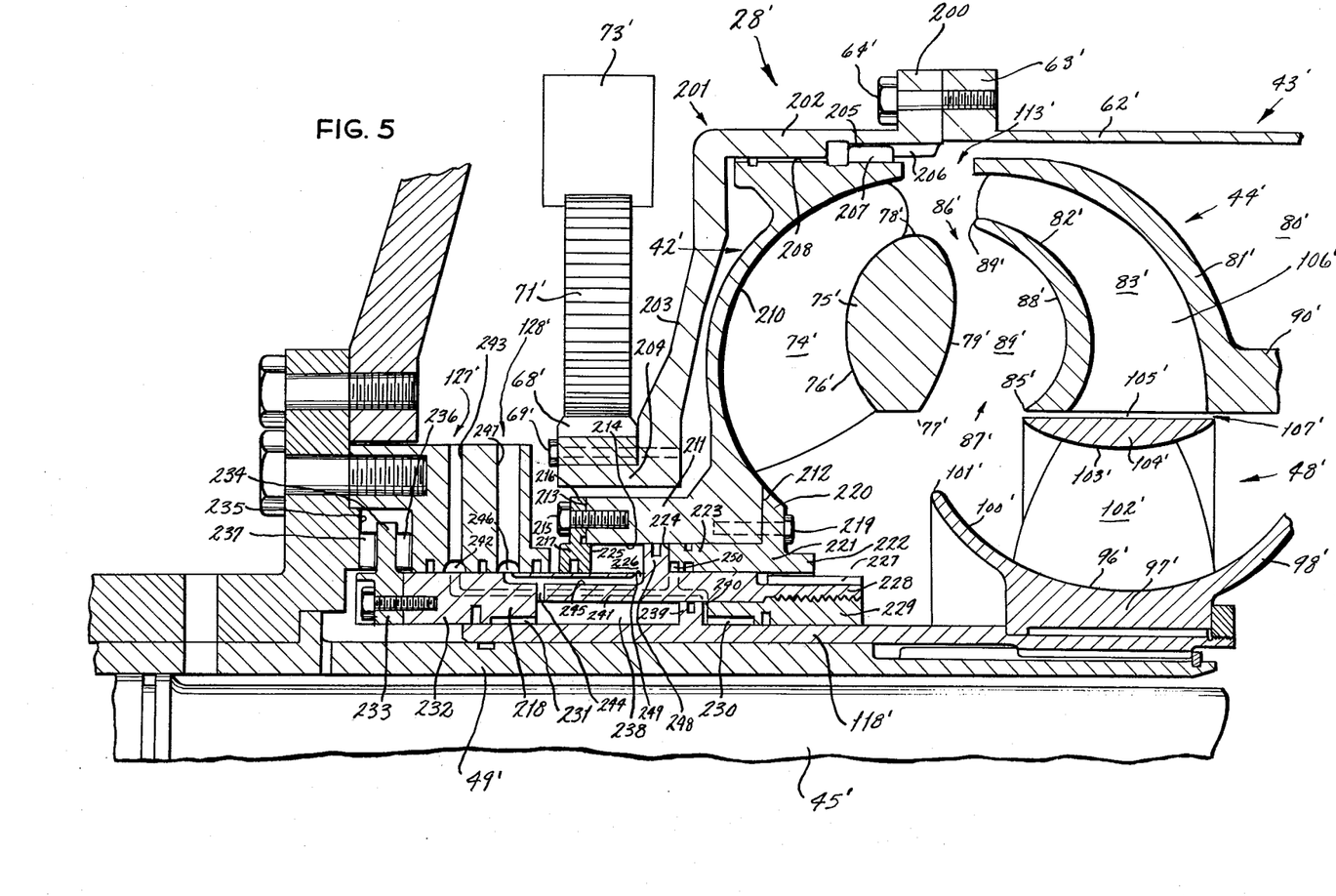
FIG. 5 is a section through another embodiment of a torque convertor constructed in accordance with and embodying the present invention illustrating structure for developing reciprocal lateral movement of the pump during operation.

Referring to FIG. 5 of the drawing, there is shown another practical embodiment of a torque converter, generally designated 28'. It wil be observed that the torque converter 28' incorporates much equivalent structure as described for the torque converter 28; therefore, the portions of the torque converter 28' corresponding to those of the torque converter 28 will be accorded like reference numerals for facilitating understanding and avoiding unnecessary repetitive explanation with only the distinct features and necessary structural details being described in detail.

Said torque converter 28' generally comprises: a pump 42' suitably connected to the engine vehicle flywheel 43'; a turbine 44' fixed to an output shaft 45'; and a reactor member 48' slideably engaged for axial movement on a reaction sleeve 49' being provided surroundingly of a portion of the output shaft 45'.

The flywheel 43' comprises a rearwardly extending annular flange 62' having a mounting skirt 63' which is fixed, as by a plurality of bolts 64' to the mounting rim 200 of a pump housing 201. Said pump housing 201 comprises an outer wall 202 and a side wall 203 which extends rearwardly and inwardly terminating into a rearwardly extending hub 204 on which is mounted a pump gear 68' being suitably secured to pump housing 201, as by bolts 69'. The pump gear 68' meshes with an idler gear 71' for driving a power takeoff shaft 73' as defined in the preceding description.

The outer wall 202 is formed on its inward face 205 with a plurality of splines 206 which are adapted to slideably engage with splines 207 fashioned in the top wall 208 of said pump 42'. The top wall 208 is integrally cast with an arcuate wall 210 which merges at its inward extremity with a rearwardly extending hub 211 having a forward end wall 212, a rearward end wall 213, and an intervening annular wall 214.

The rearward end wall 213 is bolted, as at 215, to the mounting flange 216 of an annular plate 217 which extends inwardly of the hub 211 and surroundingly of a piston rod 218. The hub forward end wall 212 is bolted, as at 219, to the mounting rim 220 carried by a tubular member 221 having a forward portion 222 and a rearward portion 223 which engages said hub annular wall 214 on one face and the piston rod 218 on the other face; said rearward portion 223 terminating in an end wall 224 located spacedly from the forward face 225 of annular plate 217. Said forward face 225, end wall 224, hub annular wall 214, and the related surface of piston rod 218 cooperate to define a fluid chamber 226, for purposes to be later described.

The forward portion 222 of the tubular member 221 is splined at 227 to the forward portion 228 of piston rod 218, which in turn is threadedly engaged to a gland 229 provided surroundingly of the tubular member 118' of the reactor member 48'. The piston rod 218 is adapted to rotate about said tubular member 118' through forward and rearward journal bearings 230, 231, respectively. Moreover, the rearward portion 232 of the piston rod 218 carries an end plate 233 having a rim 234 which projects radially outwardly within a bearing chamber 235 which houses forward and rearward thrust bearings 236, 237, respectively, on opposite faces of said rim 234 to further facilitate rotation of the piston rod 218.

Between said forward and rearward journal bearings 230, 231, respectively, the piston rod 218 is furnished with a piston chamber 238 which accommodates a piston 239 carried by the tubular member 118'. The piston chamber 238 is in communication: with the maximum power port 127' through passage 240, conduit 241, annular recess 242 and bore 243; and with the minimum power port 128', through passage 244, conduit 245, annular recess 246 and bore 247. The passage 240, 244 and conduits 241, 245 are conveniently formed within the piston rod 218.

Said piston rod 218 is integrally formed with a piston 248 received within said fluid chamber 226, which opens through a passage 249 into said conduit 245, and through an annulus 250 formed within the end wall 224 of the tubular member 221 into said conduit 241. The piston 248 does not axially move within the fluid chamber 226, so the hub 211, the annular plate 217 and the tubular member 221 serve as a reciprocating cylinder in operation.

Accordingly, when fluid enters through the maximum or minimum power ports 127', 128', fluid is exerted on both the piston 239, for reciprocally moving the reactor member 48', and the respective faces of annular plate 217 and the tubular member 221, for reciprocally moving the pump member 42' relative to the turbine 44'. The movement of the pump 42' and the reactor member 48' may or may not occur simultaneously, as displacement of the pump 42' will depend upon the flow velocity and pressure within the torus 106', as well as the friction among the various seals.

OPERATION

The operation of the torque converter 28' is similar to the operation described for torque converter 28 with the torus 106' being charged with fluid through the inlet spacing 107' and returned through outlet spacing 113' located at the junction between the pump arcuate wall 210 and the turbine arcuate wall 81'.

In the minimum power or full-bypass position (FIG. 5) fluid is directed through the minimum power port 128' through bore 247, annular recess 246, conduit 245 and passage 244 into the piston chamber 238 for urging the piston 239 forwardly, thereby presenting the flat surface 105' of reactor ring 104' in occluding relationship with the turbine 44'. The fluid flow within torus 106' then enters the inlet opening 86' of the fluid bypass 89' and exits through the outlet opening 87' to reenter the vanes 74' of the pump 42'. The flow of fluid continues through the alternate flow path of bypass 89' with any excess fluid in torus 106' being returned through the outlet spacing 113' into the fluid compartment 80', as previously described.

In addition to entering the piston chamber 238, the fluid in conduit 245 is directed into fluid chamber 226 through passage 249 for rearwardly urging the forward face 225 of the annular plate 217 to effect rearward axial displacement of pump 42'. Such movement of the pump 42' develops an increase in the dimensions of the inlet opening 86' and the outlet opening 87', thereby increasing the cross sectional area of the fluid bypass 89', as well.

In the minimum power or full bypass position the turbine 44' is driven at a reduced level with the remaining power driving the power takeoff shaft 73' through the pump gear 68' and idler gear 71', as previously described. To return the reactor member 48' and the pump member 42' to its full power position, fluid enters the maximum power port 127' for direction through bore 243, annular passage 242, conduit 241, passage 240 and the piston chamber 238 to urge the piston 239 rearwardly. Simultaneously, the fluid in conduit 241 is passed through the annulus 250 into the fluid chamber 226 for urging the end wall 224 of the tubular member 223 forwardly to effect return of the pump 42' into said full-power position.

It will be observed that through regulation of the fluid flow through the minimum and maximum power ports 127' and 128', respectively, and associated structure, the reactor member 48' and the pump member 42' may be maintained in an intermediate position between said minimum and maximum power positions. In this manner, a still greater range of modulation may be realized than ever before thought obtainable.

Having thus described our invention, what we claim and desire to obtain by Letters Patent is:

1. A torque convertor comprising:
   driven means;
   drive means;
   a source of fluid;
   at least one pump element rotatable with said drive means;
   at least one turbine element rotatable with said driven means;
   at least one reactor element;
   said pump, turbine and reactor element cooperating to define a fluid torus;
   means supplying fluid from said source to said fluid torus;
   said pump element developing fluid circulatory flow in said fluid torus to transmit power to said driven means;
   means for axially moving one of said elements to interrupt said fluid circulatory flow in said fluid torus for reducing the power transmitted to said driven means;
   a hub carried by said pump element;
   power take off means;
   means connected to said hub for driving said power take off means.

2. A torque convertor comprising:
   driven means;
   drive means;
   a source of fluid;
   at least one pump element rotatable with said drive means;
   at least one turbine element rotatable with said driven means;
   at least one reactor element;
   said pump, turbine and reactor elements cooperating to define a fluid torus;
   means supplying fluid from said source to said fluid torus;
   said pump element developing fluid circulatory flow in said fluid torus to transmit power to said driven means;
   means for axially moving one of said elements to interrupt said fluid circulatory flow in said fluid torus for reducing the power transmitted to said driven means;
   means defining a fluid bypass circuit in communication with said fluid torus;
   means for normally closing said fluid bypass circuit;
   said pump element having an outlet;
   said turbine element having an inlet;
   said fluid bypass circuit having an inlet opening located between said pump element outlet and said turbine element inlet.

3. A torque convertor as defined in claim 2 and further characterized by:
   said pump element having an inlet;
   said turbine element having an outlet;
   said fluid bypass circuit having an outlet opening located between said pump element inlet and said turbine element outlet.

4. A torque convertor as defined in claim 3 and further characterized by:
   said pump element comprising a plurality of vanes inwardly terminating in a ring having end edges;
   said turbine element comprising a plurality of vanes inwardly terminating in a ring having end margins;
   said means defining said bypass flow circuit constituting said pump ring and said turbine ring;
   each end edge of said pump ring being in spaced-apart relationship to the related end margin of said turbine ring to develop said inlet opening and said outlet opening.

5. A torque convertor as defined in claim 3 and further characterized by:
   said pump element having a ring terminating in a first edge and a second edge;
   an arcuate convex panel interconnecting said first and second edges;
   said turbine element having a ring terminating in first and second margins;
   the ring of said turbine having an inner concave surface being continuous with the first and second margins;
   said first edge being in spaced relationship to said first margin for defining said inlet opening;
   said second edge being in spaced relationship to said second margin for defining said outlet opening;
   said arcuate convex panel and said inner concave surface constituting said fluid bypass circuit.

6. A torque convertor as defined in claim 4 and further characterized by:
   said reactor element comprising a plurality of vanes inwardly terminating in a ring;
   said means for normally closing said fluid bypass circuit constituting said reactor ring.

7. A torque convertor as defined in claim 6 and further characterized by:
   said reactor ring having a flat surface facing inwardly of said vanes;
   said flat surface having a larger area than the outlet opening of said fluid bypass circuit and normally presented in occluding relationship thereto.

8. A torque convertor as defined in claim 6 and further characterized by:
   said turbine element having an outlet;
   said means for axially moving one of said elements constituting means for slideably moving said reactor element within said fluid torus to position said reactor ring between:
   a. Full occluding relationship to the outlet opening of said fluid bypass circuit, and
   b. Full occluding relationship to said turbine outlet.

9. A torque convertor as defined in claim 8 and further characterized by:
   when said reactor element is in full occluding relationship to said turbine outlet, power is distributed between the power take off means and the driven means in substantially a 9 : 1 ratio.

10. A torque convertor as defined in claim 8 and further characterized by:
said means for slideably moving said reactor element comprising:
a piston carried by said reactor element;
means located externally of said fluid torus for defining a piston chamber, said piston being received within said piston chamber for movement therein;
first conduit means connecting said piston chamber with said source of fluid;
second conduit means connecting said piston chamber with said source of fluid;
fluid control means for selectively directing fluid through said first and second conduit means whereby:
a. When fluid is directed through said first conduit means, said piston is moved longitudinally for moving the reactor ring away from full occluding position with said outlet opening to open said bypass flow circuit; and
b. When said fluid is directed through said second conduit means, said piston is moved longitudinally returning the reactor ring to full occluding position to close said bypass flow circuit.

11. The torque convertor as defined in claim 10 and further characterized by:
said flow control means being operable to position the ring of said reactor element in varying positions between full occluding position and full open position to said outlet opening.

12. The torque convertor as defined in claim 4 and further characterized by:
means for axially moving said pump element relative to said turbine element for increasing the cross-sectional area of said fluid bypass circuit.

13. A torque convertor as defined in claim 12 and further characterized by:
said means for axially moving said pump element comprising a hub carried by said pump element;
means defining a fluid chamber in said hub;
a piston received within said fluid chamber;
first conduit means connecting said fluid chamber with said source of fluid;
second conduit means connecting said fluid chamber with said source of fluid;
fluid control means for selectively directing fluid through said first and second means whereby:
a. When fluid is directed through said first conduit means, the hub and pump element are moved longitudinally forwardly to reduce the area of the inlet opening of said bypass flow circuit; and
b. When fluid is directed through said second conduit means, the hub and pump element are moved longitudinally rearwardly to increase the area of the inlet opening of said fluid bypass circuit.

14. A torque convertor as defined in claim 13 and further characterized by:
means defining a pump housing rotatably connected to said drive means;
said pump element being received within said pump housing;
means slideably connecting said pump element to said pump housing for accommodating slideable movement of said pump element relative to said pump housing.

15. A torque convertor as defined in claim 14 and further characterized by:
a second hub carried by said pump housing;
power take off means;
drive means interconnecting said second hub and said power take off means for driving said power take off means responsive to the rotation of said pump housing.

16. A torque convertor as defined in claim 13 and further characterized by:
a piston rod carrying said piston;
means connecting said piston rod to said pump element for permitting slideable axial movement of the pump element relative to the piston rod;
means defining a piston chamber in said piston rod;
a second piston carried by said reactor element received within said piston chamber;
first passage means connecting said first conduit means to said piston chamber;
second passage means connecting said second conduit means to said piston chamber; whereby:
a. When fluid is directed through said first conduit means, the second piston is moved longitudinally forwardly to position the reactor element in occluding relationship with the turbine outlet; and
b. When fluid is directed through said second conduit means, said second piston is moved longitudinally rearwardly to position the reactor element in occluding relationship with the outlet opening of said fluid bypass circuit.

* * * * *